United States Patent
Hines et al.

(10) Patent No.: US 7,321,773 B2
(45) Date of Patent: Jan. 22, 2008

(54) AREA WATCHER FOR WIRELESS NETWORK

(75) Inventors: Gordon John Hines, Kirkland, WA (US); Mario G. Tapia, Seattle, WA (US); Will Cousins, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 356 days.

(21) Appl. No.: 10/318,171

(22) Filed: Dec. 13, 2002

(65) Prior Publication Data

US 2004/0192337 A1    Sep. 30, 2004

(51) Int. Cl.
*H04Q 7/20* (2006.01)

(52) U.S. Cl. ............... 455/456.1; 455/456.2; 455/456.3; 455/456.5

(58) Field of Classification Search ............ 455/456.1, 455/456.2, 456.3, 456.5, 456.6, 414.3
See application file for complete search history.

(56) References Cited

U.S. PATENT DOCUMENTS

| | | | |
|---|---|---|---|
| 6,434,381 B1 * | 8/2002 | Moore et al. ............ 455/414.3 |
| 6,609,004 B1 * | 8/2003 | Morse et al. ............ 455/456.5 |
| 6,847,822 B1 * | 1/2005 | Dennison et al. ......... 455/456.1 |
| 6,867,733 B2 * | 3/2005 | Sandhu et al. ............ 455/456.3 |
| 2002/0102996 A1 * | 8/2002 | Jenkins ..................... 455/456 |
| 2002/0111172 A1 * | 8/2002 | DeWolf et al. ............ 455/456 |
| 2003/0013449 A1 * | 1/2003 | Hose et al. ................ 455/440 |
| 2003/0040272 A1 * | 2/2003 | Lelievre et al. ........... 455/3.06 |
| 2003/0119521 A1 * | 6/2003 | Tipnis et al. ............... 455/456 |

* cited by examiner

*Primary Examiner*—Joseph Feild
*Assistant Examiner*—Huy D Nguyen
(74) *Attorney, Agent, or Firm*—William H. Bollman (57) ABSTRACT

Dynamic and current information is provided regarding a wireless device's entry into or exit from a geographically defined "watched" area. An area watcher application monitors preconfigured wireless devices entry/exit into preconfigured watched areas. The watched areas may watch for any/all subscribers, or for select, preconfigured subscribers listed in an appropriate table or database. Provision of location information is triggered by a wireless subscriber's entry, exit or changing between designated 'watched' areas or locations. Continuous polling may be used, or the mobile device itself or network element may be triggered to push its own location upon notification of its entry into or out of watched areas from an area watcher. A third party may be notified when a wireless user enters an area surrounding their retail store, and be sent a message such as "sale inside", or "Your rentals are overdue", on their wireless device.

16 Claims, 7 Drawing Sheets

When a watched UE enters a defined area,
the location server or UE trigger a message to report the UE location to the Location.

Area Watch triggered by polling User Equipment

When a watched UE enters a defined area,
the location server or UE trigger a message to report the UE location to the Location.

When a watched UE leaves a defined area, the location server or UE trigger a message to report the UE location to the Location.

FIG. 7

AREA WATCHER FOR WIRELESS NETWORK

BACKGROUND OF THE INVENTION

1. Field of the Invention

This invention relates generally to wireless and long distance carriers, Internet service providers (ISPs), and information content delivery services/providers and long distance carriers. More particularly, it relates to location services for the wireless industry.

2. Background of Related Art

The Location Interoperability Forum (LIF), the Wireless Application Protocol (WAP) Forum, and $3^{rd}$ Generation Partnership Project (3GPP) have attempted to define an area trigger via Application Protocol Interfaces (APIs) specific to these groups.

The problem with the above solutions is that they are not well defined or do not implement schemes that would permit functionality to support area watching features such as are provided by the present invention.

SUMMARY OF THE INVENTION

In accordance with the principles of the present invention, a subscriber feature for a wireless system comprises a database associating a particular wireless device with at least one geographic area. An area watcher outputs a trigger message upon the particular wireless device's entry into or exit from the at least one geographic area.

A method of providing a message to a wireless device upon their entry or exit from a pre-defined geographic area in accordance with another aspect of the present invention comprises establishing a watched geographic area. Location information regarding wireless devices is monitored, and an area watch message is triggered upon detection of a particular wireless device's entry into the watched geographic area.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides an architecture and method in a wireless messaging and/or telephonic system for providing information regarding when a wireless network device (e.g., a wireless phone) enters and/or leaves a geographically defined area that is being "watched" by an area watcher application. The area watcher application commissions and intertwines location based wireless services in a service provider's network with a message system to automatically provide to a requesting third party information regarding a subscriber's dynamic proximity to a watched area.

An area watcher is a monitoring service that delivers mobile device location information triggered by a wireless subscriber's entry, exit or changing between designated 'watched' areas or locations.

Exemplary techniques of watching a designated area or location include, e.g., 1) continuous polling of the mobile device under the direction of an area watcher application program; 2) a software feature in the mobile device itself pushes its location to an area watcher application program; or 3) devices in the radio network determine a location of the mobile device subject to an area watch application, and pushes the location to an element under the direction of the area watch application.

Definitions of the particular 'areas' being watched are important to the successful implementation of an area watcher. In the disclosed embodiments, geographical codes are used to define the various watched area(s), e.g., postal code, principality, state, and/or country. Alternatively, the watched areas may be defined by their relationship to elements of a particular telecommunication network, e.g., within a particular cell site area, within a particular location area (e.g., a group of cell site areas), within a mobile switching center (MSC) area (i.e., within a group of location areas), and within the Public Land Mobile Network (i.e., within a group of MSC Areas).

An updating service may optionally be implemented wherein the watched area(s) for a particular mobile device may be modified.

The area watcher feature may be preconfigured and left ongoing, or may be a polled type request by a third party requesting confirmation of the presence of a particular wireless user in a particular geographic area.

Area watcher services have many uses. For instance, using an area watcher service that notifies a third party when a wireless user enters an area surrounding their retail store. The retailer might then provide a timely short message to the wireless user relating to sales or promotions occurring at the retail store when they are proximate to it. As another example, a video rental store might send a "reminder" message "Your rentals are overdue", on their wireless device as they walk by the store. Services might remind customers of appointments, or even send directions to a particular floor or office in a building when the client comes close to the building. The services might even be just geographic in nature, e.g., special events being held nearby. The possibilities are endless.

The area watch service may allow soliciting by third parties, or it may allow soliciting only once permitted by the wireless user (e.g., to let them know of promotions at a particular store or mall whenever they become proximate to it).

Figure 1:
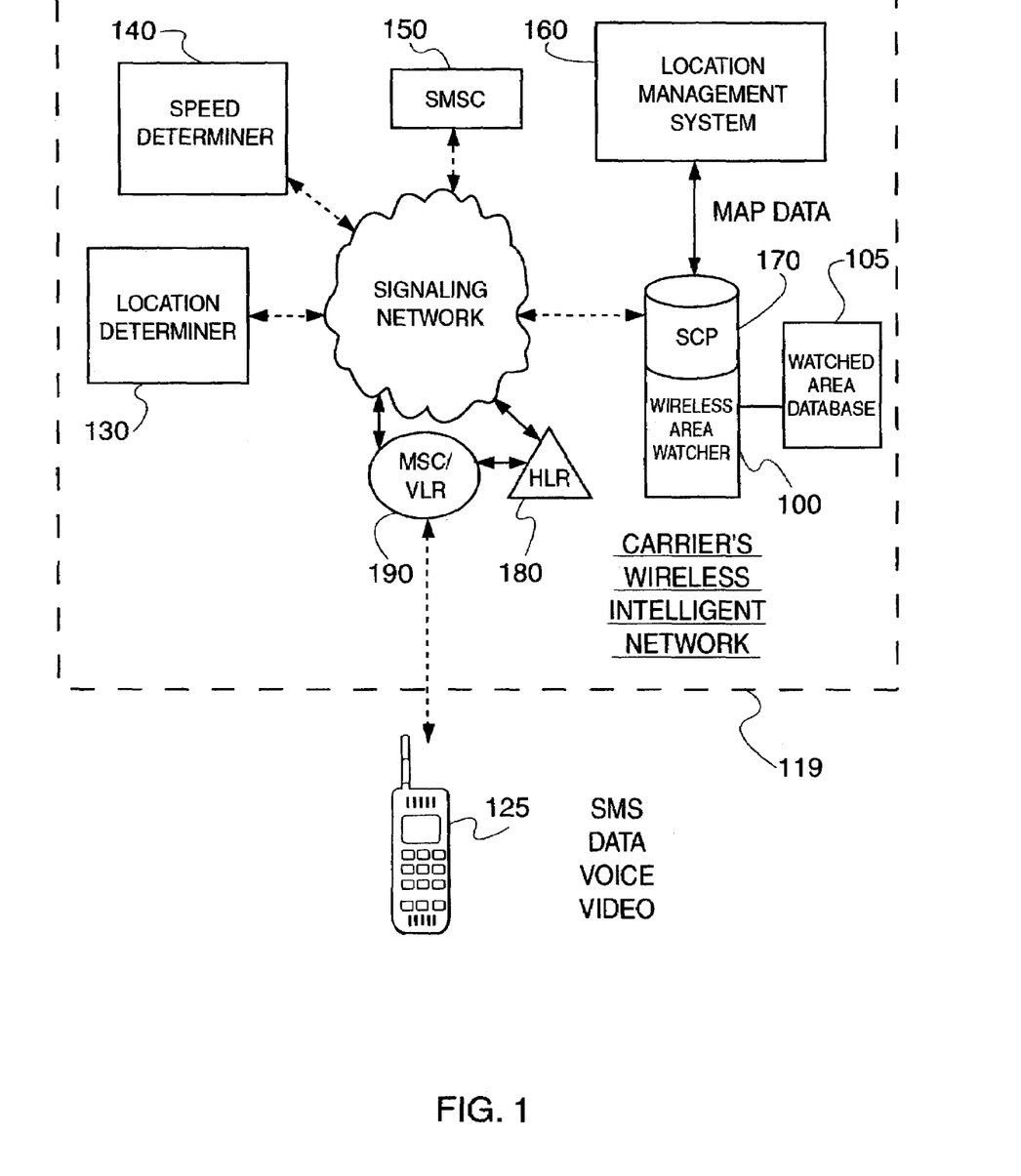
FIG. 1 shows a wireless network tour guide application resident in an SCP of a carrier's wireless intelligent network, in accordance with the principles of the present invention.

FIG. 1 shows a wireless area watcher application 100 for a wireless network application resident in a service control point (SCP) 170 of a carrier's wireless intelligent network 119, in accordance with the principles of the present invention. While shown resident in an SCP 170, an area watcher application 100 may be resident in any one (or more) suitable element(s) of a wireless carrier's network, in accordance with the principles of the present invention.

As shown in FIG. 1, an SCP 170 of a carrier's wireless intelligent network 119 is adapted to include a wireless area watcher application 100. The wireless area watcher 100 communicates with a location management system 160, a location determiner 130, and a speed determiner 140, all in the wireless carrier's network. The wireless network 119 of the disclosed embodiment further includes a Short Message Service Center (SMSC) 150, Message Servicing Center (MSC) with Visitors Location Register (VLR) 190 and Home Location Register (HLR) 180.

The wireless area watcher 100 in accordance with the principles of the present invention utilizes location information determined by a location determiner 130 to determine a proximate location of a wireless user, and then uses that location information to determine if the wireless user is within an area being watched.

Figure 2:
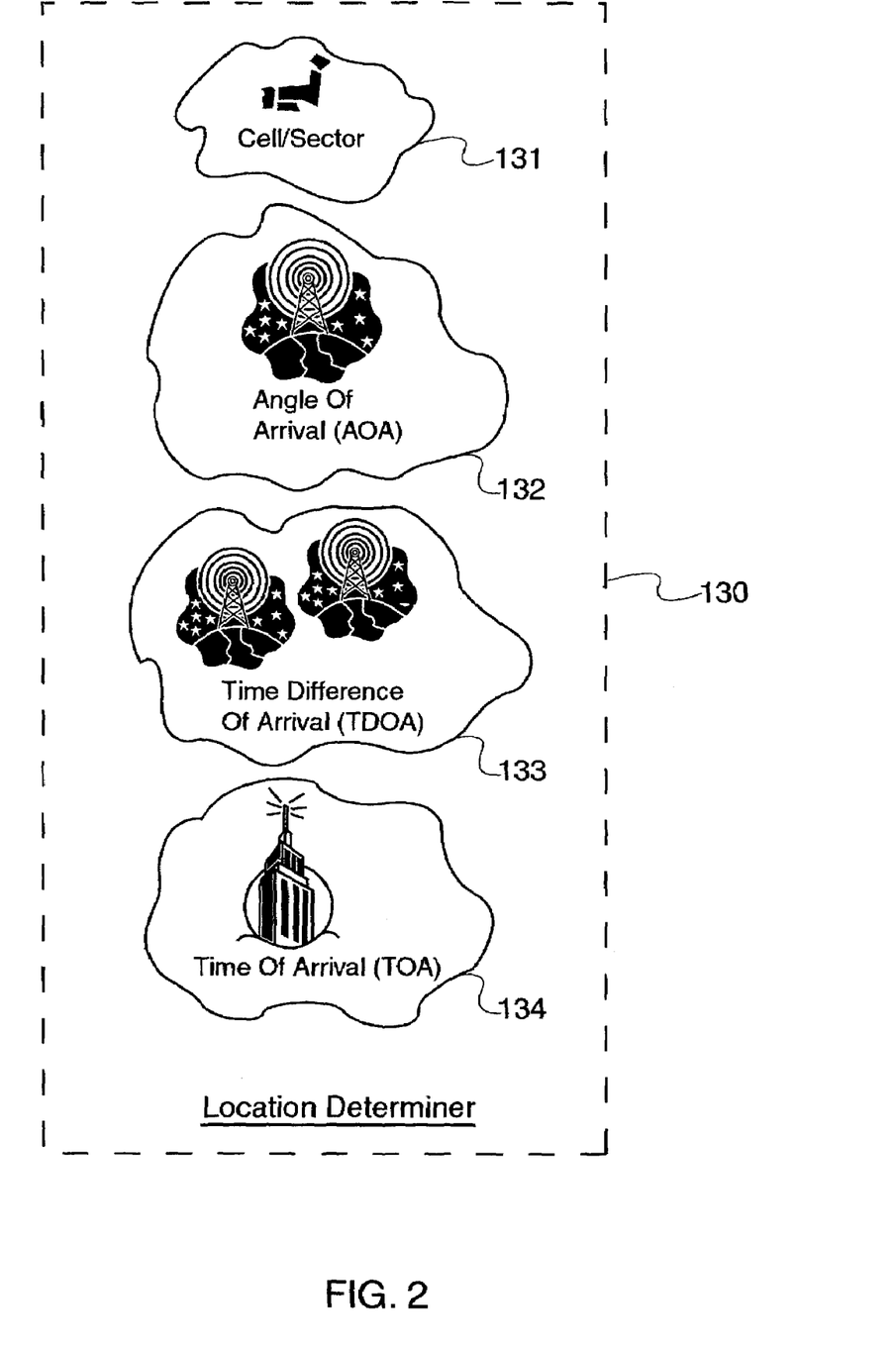
FIG. 2 depicts various embodiments of a location determiner shown in FIG. 1.

FIG. 2 depicts various examples of location determiners 130 shown in FIG. 1 that may be utilized by the present invention.

In particular, as shown in FIG. 2, the location determiner 130 and location management system 160 perform the location management functions of determining subscriber location. Exemplary techniques implemented in the location determiner 130 are call/sector ID 131, angle of arrival (AOA) 132, time difference of arrival (TDOA) 130, time of arrival (TOA) 134, all of which are otherwise known in the art. The present invention is entirely separate from the particular type of location detection used. Any suitable type of location determination may be used in conjunction with an area watcher.

Returning to FIG. 1, location information is determined by the location determiner 130 at the wireless network, though location may alternatively be determined in the wireless device itself (e.g., using a Global Positioning Satellite (GPS) system) and provided to the wireless area watcher 100, which in turn compares the wireless user ID and location information to entries in a watched area database 105.

Speed information may optionally be determined by the location management system of the wireless network 119, to augment the area watcher services. For instance, the slower the speed of the wireless user (e.g., indicating a pedestrian rather than a motorist), perhaps the more likely they are to be affected by information about a promotion occurring therein.

The speed determiner 140 may determine speed of a wireless device (e.g., walking tour, driving tour, flying tour, etc.) inferentially. The speed may be used, e.g., to determine relevance of the proximity of the wireless subscriber. For instance, if a wireless subscriber is passing by a retail store while driving at full speed on an Interstate highway, a message related to the retail store may be more nuisance than benefit.

A location and time history may be maintained by the location management system 160 with respect to particular subscribers being watched by the wireless area watcher 100.

A generalized determination of speed may be sufficient for many applications, e.g., whether the wireless device acts as if it is consistent with a walking subscriber, driving subscriber, biking subscriber, flying subscriber, etc. The wireless subscriber being watched by the wireless area watcher 100 may alternatively be prompted by the wireless area watcher 100 and/or location management system 160 to manually (or audibly) input a particular mode of transportation, generally indicate whether their speed is less than or greater than a given speed, e.g., less than 5 miles/hour (e.g., walking) or more than 5 miles/hour (e.g., biking, driving, etc.) Of course, the wireless subscriber may also be prompted for location information, which may be input manually, though the present invention is focused more on the advantages that an automated implementation of the area watcher provides.

Voice recognition may be implemented in the carrier's wireless network 119 (e.g., accessible to the SCP 170) to simplify a user's input of relevant information, e.g., in navigating through an appropriate user interface menu. For instance, a user can speak the name or other identifying feature of areas that they would like to be "watched" in.

Figure 3:
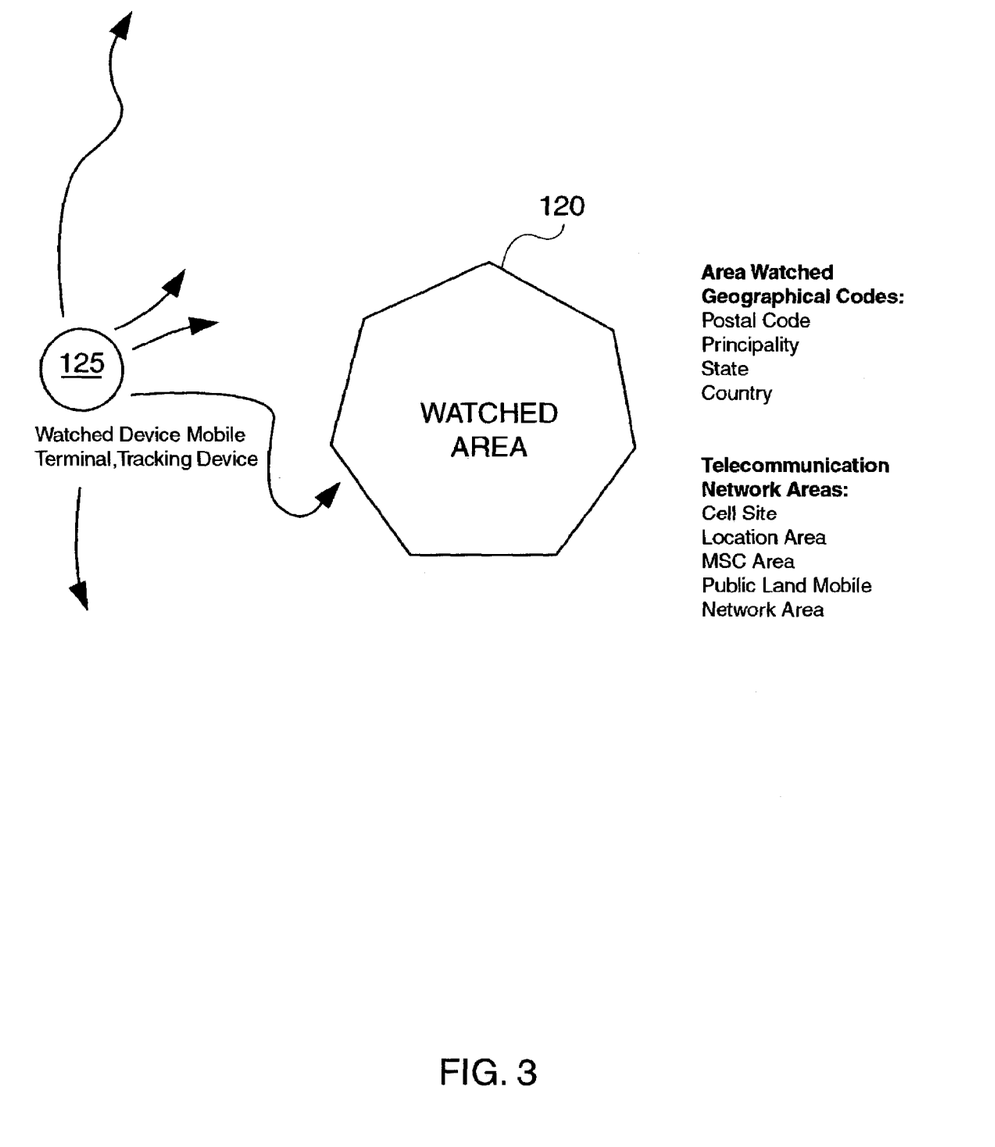
FIG. 3 depicts an established Area Watch and a relevant watched UE/MS device, in accordance with the principles of the present invention.

FIG. 3 depicts an established area watch feature for at least one particular watched UE/MS device, in accordance with the principles of the present invention.

As shown in FIG. 3, a watched area 120 is defined in any suitable and appropriate manner, e.g., by geographical related boundaries, or by telecommunication network defined boundaries. Exemplary geographical related boundaries include, e.g., by street, by postal code, by principality, and even by state or country. Exemplary telecommunication network defined boundaries include, e.g., by cell site, by location area, by mobile switching center (MSC) area, or by public land mobile network area.

The watched area 120 monitors if/when a watched device 125 enters the boundaries of the watched area 120. While the boundaries are ideally accurately defined, specific perimeters may be fuzzy due to the nature of radio communications. Nevertheless, the boundaries will be as accurate as the specific location technology being used. For instance, if the watched device includes a Global Positioning Satellite (GPS) system for location information, the boundaries of the watched area will be extremely accurate. On the other hand, if radio communication type location technology such as angle of arrival and/cell sector is used the exact location of the boundaries of the watched area 120 may be somewhat fuzzier.

Figure 4:
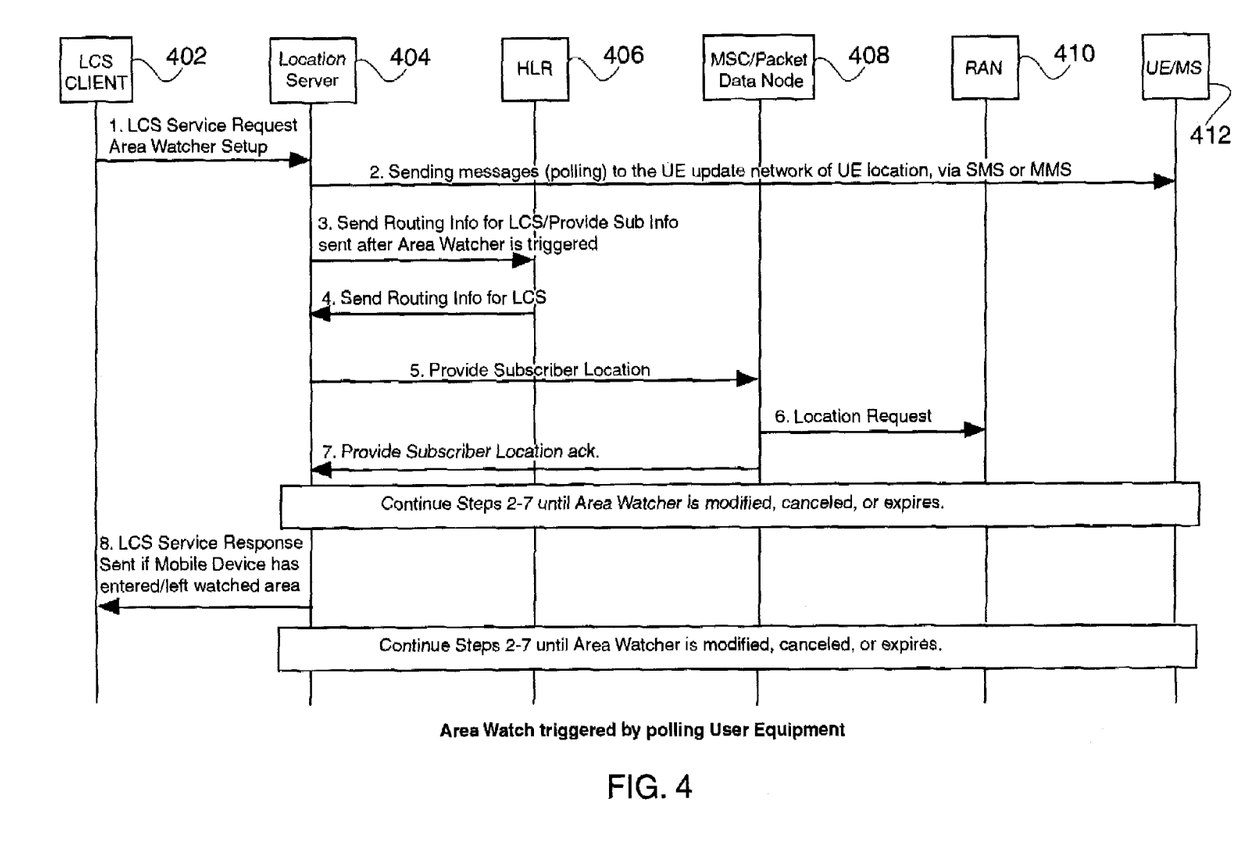
FIG. 4 shows an Area Watch event triggered by polling user equipment, in accordance with one aspect of the present invention.

FIG. 4 shows an Area Watch event triggered by polling user equipment, in accordance with one aspect of the present invention. Elements involved in the events shown in FIG. 4 include a location services client (LCS) client 402, a location server (LS) 404, a home location register (HLR) 406, an MSC/packet data node 408, a radio access network (RAN) 410, and user equipment or mobile subscriber (UE/MS) 412.

The disclosed network elements 402-412 are by way of example only. Of course, other elements in a wireless network may be implemented within the scope of the present invention.

As shown in step 1 of FIG. 4, a location services (LCS) client 402 sends a message and sets up an area to watch to a relevant location server 404.

In step 2, once the area watch feature is setup, messages are sent to the user equipment/mobile subscriber 412 to update the network with current and live location information regarding the mobile subscriber 412, e.g., by MSC location, cell site location, etc.

In step 3, once the location update is made, the location server 404 requests routing information, and location information such as MSC and perhaps cell site information, to the home location register (HLR) 406.

In step 4, the response to the request made in step 3 is sent.

In step 5, location is requested to either the MSC or packet data node 408 for precise location information, e.g., GPS location information, location information provided using triangulation methods, etc.

In step 6, the location request is forwarded to the radio access network (RAN) 410 if needed.

In step 7, a response to the location request is sent to the location server 404.

Steps 2-7 are repeatedly performed in the exemplary embodiment, e.g., at a designated intervals, to monitor for specific mobile subscribers such that the relevant mobile subscriber 412 will be detected upon entering or leaving a particular watched area 120.

In step 8, if the location reported to the location server 404 determines that the mobile subscriber 412 has entered or left a watched area 120, a message is sent to the relevant LCS client 402 (e.g., the LCS client that originally established the area watch feature for that watched area 120, for that mobile subscriber 125, which that mobile subscriber 125 just entered).

Figure 5:
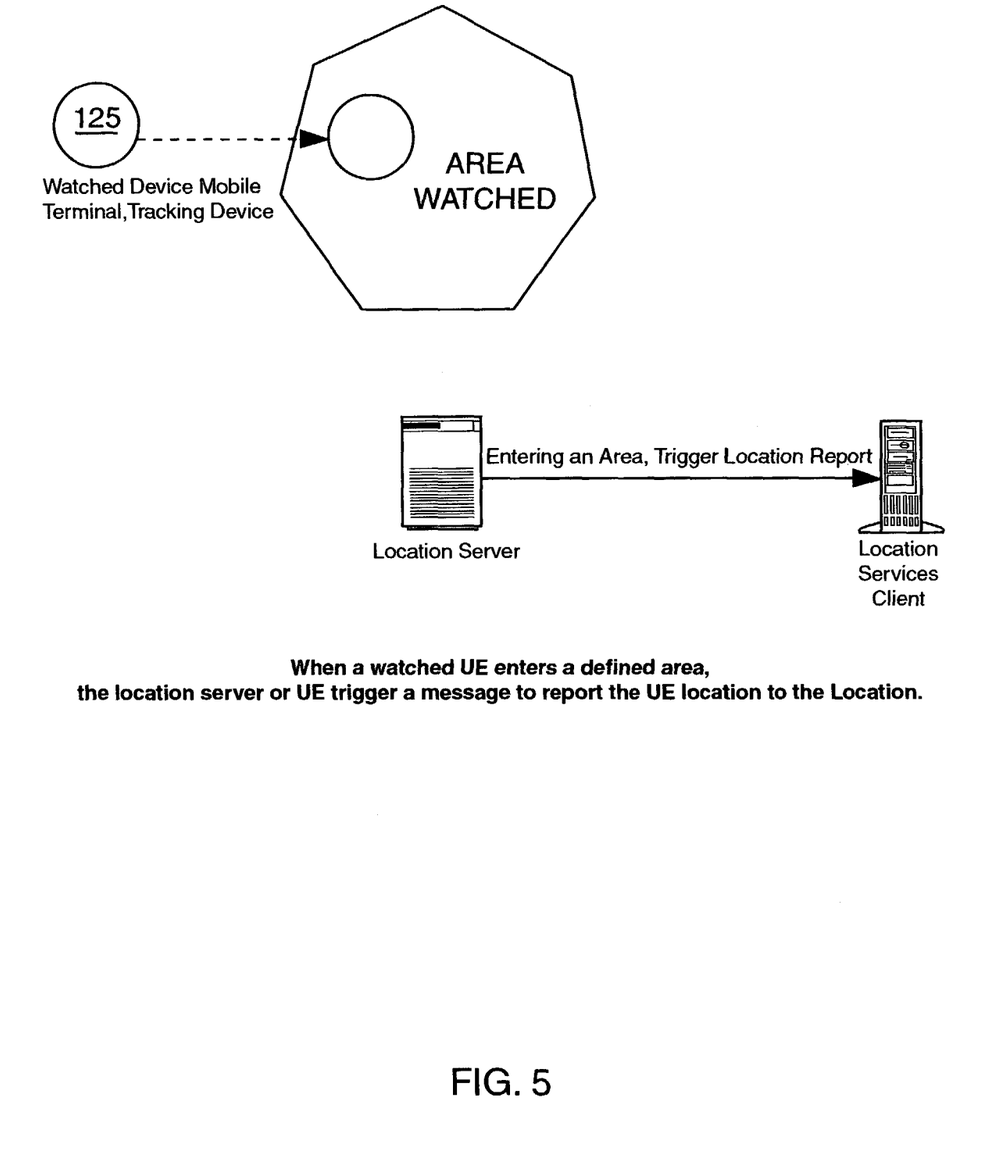
FIG. 5 shows when a watched UE enters a defined area, the location server of UE triggers a message to report the UE location to the Location, in accordance with the principles of the present invention.

FIG. 5 shows when a watched mobile subscriber 125 enters a particular defined watched area 120, the location server 404 of the mobile subscriber 125 triggers a message to report its location, in accordance with the principles of the present invention.

Figure 6:
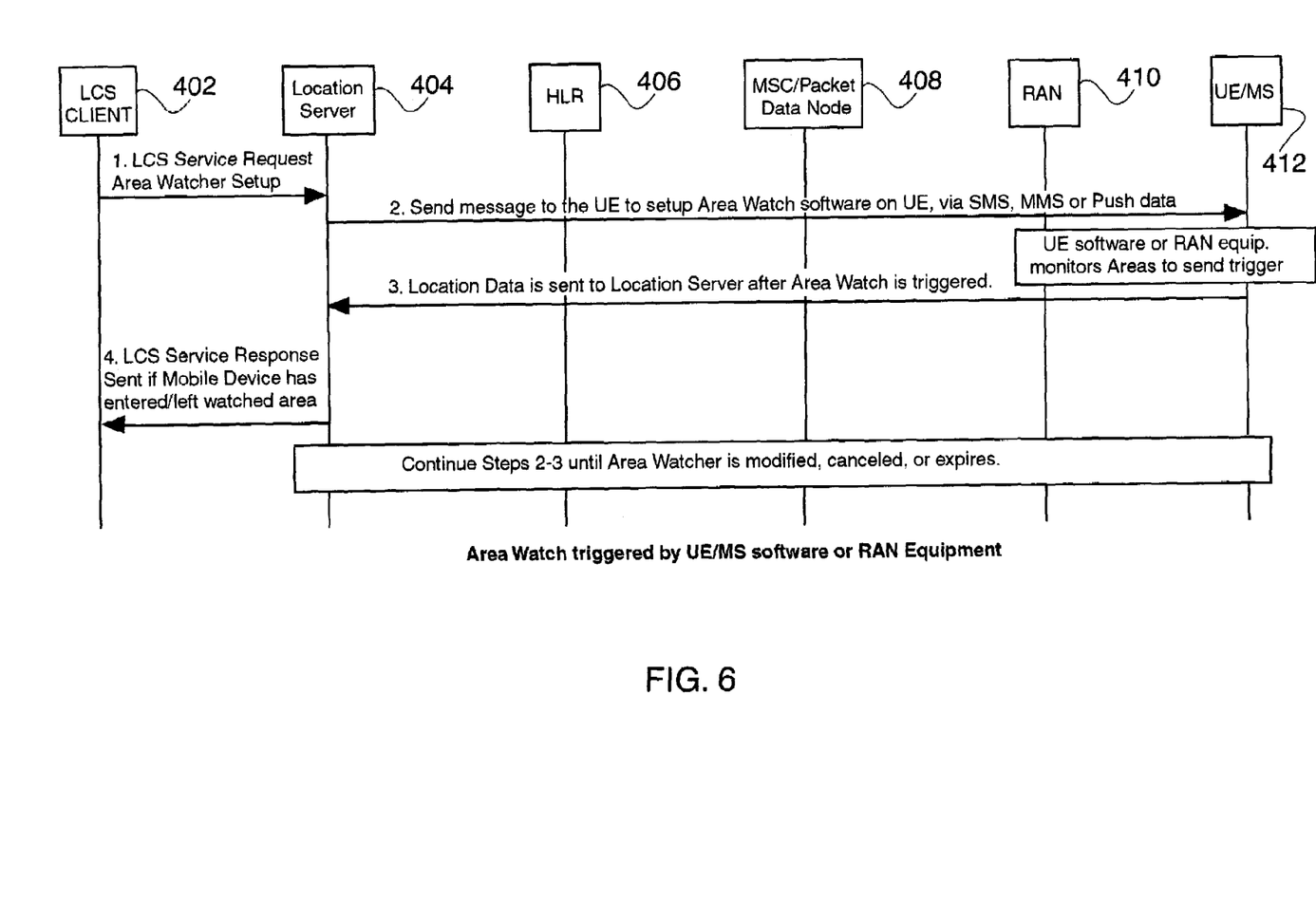
FIG. 6 shows an Area Watch event triggered by UE/MS software or RAN equipment, in accordance with another aspect of the present invention.

FIG. 6 shows a Area Watch triggered by mobile subscriber software or radio access network equipment, in accordance with the principles of the present invention.

In particular, as shown in step 1 of FIG. 6, a location services client 402 sends a message and sets up an area to watch to the location server 404.

In step 2, once the area watch feature is established and set up, messages are sent to the MSC/packet data node 408 or mobile subscriber 125 to establish a watch for that particular subscriber, in that particular watched area 120.

Software on the mobile subscriber 125 or MSC/packet data node 408 monitor the location of the mobile subscriber 125 until the software determines that the mobile subscriber 125 has entered or left the relevant watched area 120.

In step 3, if the area watcher module determines that any watched mobile subscriber 125 has entered or left this (or other) watched area 120, accurate location information regarding that mobile subscriber 125 is sent to the LCS client 402 that set up the area watch feature in the first place.

Then finally, in step 4, the location information regarding the watched mobile subscriber 125 is forwarded to the relevant LCS client 402 (e.g., the LCS client 402 that originally established the watch for that mobile subscriber 125 in that watched area 120).

Figure 7:
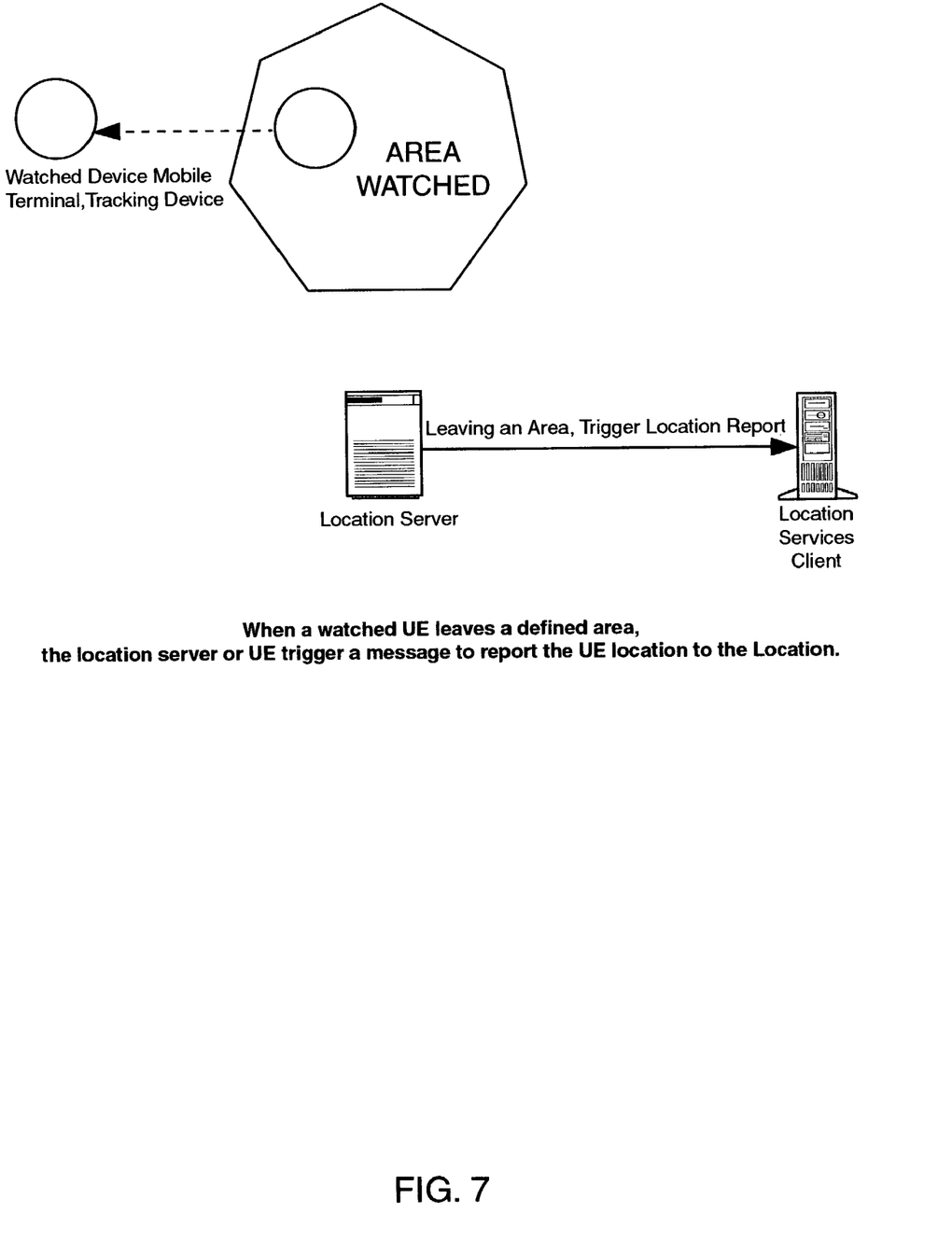
FIG. 7 shows when a watched UE leaves a defined area, the location server or UE triggers a message to report the UE location to the Location, in accordance with the principles of the present invention.

FIG. 7 shows that when a watched mobile subscriber 125 leaves a defined watched area, the location server 404 or mobile subscriber 125 triggers a message to report the location of that mobile subscriber 125 to the location server 404, in accordance with the principles of the present invention.

Thus, in accordance with the principles of the present invention, a watched device 125 may report location periodically, or in response to repeated or periodic triggers (e.g., polling). The location may be reported, triggering a watched area event, as a result of an action performed by the mobile subscriber wireless device 125, or by its entering or leaving a designated watched area 120.

An area watcher in accordance with the principles of the present invention has particular application for use with vendors of location services (e.g., with GMLS and MPC).

An area watcher in accordance with the principles of the present invention may be implemented with any desirable level of privacy protections, including levels that restrict transmission of location information for those particular subscribers that opt-out of the service, or who otherwise desire that their location information not be provided to third parties. For instance, existence in the watched area may be reported without disclosure of the exact location of the particular mobile subscriber 125.

In accordance with the present invention, information may or may not be provided with respect to when the wireless user 125 exits the area being watched 120, depending upon the particular needs of the wireless carrier. Elimination of "exit" messages would reduce network loading. Alternatively, polling or other occasional updates may be implemented to confirm the continued presence of the mobile subscriber 125 in a particular area 120 being watched. Upon the absence of a confirmation message when expected, the wireless user 125 can then be presumed by the requesting third party to have exited the watched area 120.

Moreover, to assure the privacy of wireless users, accurate location information may be blocked from transmission to the requesting third party. If such a feature is desired, only the affirmative "present" type information, or "not present" information may be provided to the requesting third party. This would indicate merely that the mobile subscriber 125 is somewhere in the watched area 120, but does not want to provide the third party with exact location information.

While the invention has been described with reference to the exemplary embodiments thereof, those skilled in the art will be able to make various modifications to the described embodiments of the invention without departing from the true spirit and scope of the invention.

What is claimed is:

1. A subscriber feature for a wireless system, comprising:
   a database associating a particular wireless device with at least one geographic area;
   a speed determiner to determine a speed of said particular wireless device relative to said at least one geographic area;
   an area watcher to selectively output at least one trigger message from a plurality of trigger messages for said at least one geographic area, said at least one trigger message being selected from said plurality of trigger messages based on said determined speed of said particular wireless device upon said particular wireless device's entry into or exit from said at least one geographic area.

2. The subscriber feature for a wireless system according to claim 1, wherein:
   said geographic area is defined by a zip code.

3. The subscriber feature for a wireless system according to claim 1, wherein:
   said geographic area is defined by boundaries of the reach of a particular cell site.

4. The subscriber feature for a wireless system according to claim 1, wherein:
   said geographic area is defined by proximity to a particular retail establishment.

5. A method of providing a message to a wireless device upon their entry or exit from a pre-defined geographic area, comprising:
   establishing a watched geographic area;
   monitoring location information regarding wireless devices;
   monitoring a speed of said wireless device relative to said at least one geographic area; and
   selectively triggering at least one area watch message from a plurality of area watch messages for said at least one geographic area, said at least one area watch message being selected from said plurality of area watch messages based on said monitored speed of said wireless device upon detection of a particular wireless device's entry into said watched geographic area.

6. The method of providing a message to a wireless device upon their entry or exit from a pre-defined geographic area according to claim 5, wherein:
said triggered area watch message relates to unsolicited retail information.

7. The method of providing a message to a wireless device upon their entry or exit from a pre-defined geographic area according to claim 5, further comprising:
associating at least one particular wireless device with said established, watched geographic area.

8. The method of providing a message to a wireless device upon their entry or exit from a pre-defined geographic area according to claim 5, wherein:
said monitoring comprises polling of location information regarding wireless users.

9. The method of providing a message to a wireless device upon their entry or exit from a pre-defined geographic area according to claim 5, wherein
said monitoring comprises a location push by said wireless device.

10. The method of providing a message to a wireless device upon their entry or exit from a pre-defined geographic area according to claim 5, wherein:
said monitoring comprises a location push by a wireless carrier network servicing said wireless device.

11. Apparatus for providing a message to a wireless device upon their entry or exit from a pre-defined geographic area, comprising:
means for establishing a watched geographic area;
means for monitoring location information regarding wireless devices;
means for monitoring a speed of said wireless device relative to said at least one geographic area; and
means for selectively triggering at least one area watch message from a plurality of area watch messages for said at least one geographic area, said at least one area watch message being selected from said plurality of area watch messages based on said monitored speed of said wireless device upon detection of a particular wireless device's entry into said watched geographic area.

12. The apparatus for providing a message to a wireless device upon their entry or exit from a pre-defined geographic area according to claim 11, wherein:
said triggered area watch message relates to unsolicited retail information.

13. The apparatus for providing a message to a wireless device upon their entry or exit from a pre-defined geographic area according to claim 11, further comprising:
means for associating at least one particular wireless device with said established, watched geographic area.

14. The apparatus for providing a message to a wireless device upon their entry or exit from a pre-defined geographic area according to claim 11, wherein:
said means for monitoring polls location information regarding wireless users.

15. The apparatus for providing a message to a wireless device upon their entry or exit from a pre-defined geographic area according to claim 11, wherein
said monitoring comprises a location push by said wireless device.

16. The apparatus for providing a message to a wireless device upon their entry or exit from a pre-defined geographic area according to claim 11, wherein:
said monitoring comprises a location push by a wireless carrier network servicing said wireless device.

* * * * *

UNITED STATES PATENT AND TRADEMARK OFFICE
CERTIFICATE OF CORRECTION

| | | |
|---|---|---|
| PATENT NO. | : 7,321,773 B2 | Page 1 of 1 |
| APPLICATION NO. | : 10/318171 | |
| DATED | : January 22, 2008 | |
| INVENTOR(S) | : Gordon John Hines, Mario G. Tapia and Will Cousins | |

It is certified that error appears in the above-identified patent and that said Letters Patent is hereby corrected as shown below:

In the Claims

Column 6, line 65, Claim 5: "at least one geographic area: and", should be -- watched geographic area; and --

Column 7, line 38, Claim 11: "relative to said at least one geographic area; and", should be -- relative to said watched geographic area; and --

Signed and Sealed this
Twenty-fifth Day of November, 2014

Michelle K. Lee
*Deputy Director of the United States Patent and Trademark Office*